US012570317B2

(12) United States Patent
Taylor et al.

(10) Patent No.: US 12,570,317 B2
(45) Date of Patent: Mar. 10, 2026

(54) VEHICLE SYSTEMS AND METHODS FOR AUTONOMOUS OPERATION USING UNCLASSIFIED HAZARD DETECTION

(71) Applicant: GM GLOBAL TECHNOLOGY OPERATIONS LLC, Detroit, MI (US)

(72) Inventors: Travis Taylor, Ann Arbor, MI (US); Christopher Michael Wallace, Waterford, MI (US); Paul A Adam, Milford, MI (US); Christopher Michael Churay, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 18/333,383

(22) Filed: Jun. 12, 2023

(65) Prior Publication Data

US 2024/0409125 A1     Dec. 12, 2024

(51) Int. Cl.
    *B60W 60/00*     (2020.01)
    *B60W 30/12*     (2020.01)
    *B60W 30/18*     (2012.01)

(52) U.S. Cl.
    CPC ........ *B60W 60/0011* (2020.02); *B60W 30/12* (2013.01); *B60W 30/18163* (2013.01); *B60W 2420/403* (2013.01); *B60W 2420/408* (2024.01); *B60W 2552/10* (2020.02); *B60W 2556/40* (2020.02)

(58) Field of Classification Search
    CPC ..... B60W 2420/403; B60W 2420/408; B60W 30/09; B60W 30/0956; G06V 20/56; G06V 20/58; G06V 20/588; G06V 10/76; G06V 10/764; G06V 10/765; G08G 1/16; G08G 1/166; G08G 1/167; G01S 13/931;
    (Continued)

(56) References Cited

U.S. PATENT DOCUMENTS

| | | | |
|---|---|---|---|
| 11,807,238 B2 * | 11/2023 | Dobi | G06V 20/58 |
| 12,097,859 B2 * | 9/2024 | Rahman | B60W 30/16 |

(Continued)

FOREIGN PATENT DOCUMENTS

| | | |
|---|---|---|
| DE | 102014212478 A1 | 12/2015 |
| DE | 102014212704 B4 | 5/2021 |

(Continued)

*Primary Examiner* — Fadey S. Jabr
*Assistant Examiner* — Mario C Gonzalez
(74) *Attorney, Agent, or Firm* — Ingrassia Fisher & Lorenz, LLP | IF&L

(57)     ABSTRACT

Systems and methods are provided for detecting unclassified hazards for a driver assistance system of a vehicle. The systems include a data storage device comprising map data, one or more sensors configured to generate sensor data indicative of one or more sensed objects in proximity to the vehicle, and a controller configured to, by one or more processors thereof, receive the map data and the sensor data, filter the sensor data to omit at least one of the sensed objects located outside of a bounding area that includes a portion of an adjacent lane next to a current lane in which the vehicle is operating, determine whether an unclassified hazard is present in the adjacent lane, and maintain operation of the vehicle in the current lane in response to a determination that the unclassified hazard is present in the adjacent lane.

19 Claims, 8 Drawing Sheets

(58) Field of Classification Search
CPC ......... G01S 17/931; G06T 2207/30252; G06T
2207/30261; G06T 2207/10028
See application file for complete search history.

(56) References Cited

U.S. PATENT DOCUMENTS

| | | | |
|---|---|---|---|
| 2004/0117090 A1* | 6/2004 | Samukawa | G01S 7/4026 |
| | | | 701/45 |
| 2017/0097414 A1* | 4/2017 | You | G01S 13/931 |
| 2018/0088228 A1* | 3/2018 | Li | G01S 13/865 |
| 2019/0035280 A1* | 1/2019 | Kim | G08G 1/167 |
| 2021/0101589 A1* | 4/2021 | Jeon | G05D 1/0061 |
| 2021/0405185 A1* | 12/2021 | Price | G01S 13/931 |
| 2022/0176983 A1* | 6/2022 | Kakeda | B60W 50/14 |

FOREIGN PATENT DOCUMENTS

| | | | |
|---|---|---|---|
| DE | 102019217006 A1 | 5/2021 | |
| DE | 102020200183 A1 | 7/2021 | |

* cited by examiner

VEHICLE SYSTEMS AND METHODS FOR AUTONOMOUS OPERATION USING UNCLASSIFIED HAZARD DETECTION

INTRODUCTION

The technical field generally relates to vehicle systems and more particularly relates to autonomous operation of a vehicle configured for detecting unclassified hazards to promote automatic lane change safety.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired. For example, traffic, road conditions and other obstacles or scenarios can be encountered that impair autonomous operation. In lower-level automation systems (e.g., Level Three or below), such scenarios may require a driver or other vehicle occupant manually control or operate the vehicle in some instances, which introduces a burden on a rider that is somewhat contrary to the intent of the automation. Accordingly, it is desirable to provide vehicle control systems and methods that are capable of autonomously resolving scenarios and arriving at a satisfactory solution for how to autonomously operate the vehicle with reduced burden on the driver to improve the user experience. Other desirable features and characteristics of the present invention will become apparent from the subsequent detailed description and the appended claims, taken in conjunction with the accompanying drawings and the foregoing technical field and background.

SUMMARY

A method is provided for detecting and mitigating unclassified hazards for a driver assistance system of a vehicle. In one embodiment, the method includes obtaining, from a data storage device, map data that includes information relating to a road including lane geometry, obtaining, from one or more sensors of the vehicle, sensor data that includes one or more sensed objects in proximity to the vehicle, filtering, with the one or more processors, the sensor data to omit at least one of the one or more sensed objects located outside of a bounding area that includes a portion of an adjacent lane next to a current lane in which vehicle is operating, the bounding area having a size determined by, at least in part, the map data and a current position of the vehicle, determining, with the one or more processors, whether an unclassified hazard is present in the adjacent lane based on, at least in part, a quantity of the one or more sensed objects located within the bounding area, and maintaining, with the one or more processors, operation of the vehicle in the current lane in response to a determination that the unclassified hazard is present in the adjacent lane.

In various embodiments, the method includes preventing, with the one or more processors, an autonomous lane change by the driver assistance system in response to a determination that the unclassified hazard is present in the adjacent lane.

In various embodiments, the method includes producing, by the one or more processors, a normalized bounding area that includes an area that is smaller than an area of the bounding area based on a normalized error of the one or more sensors.

In various embodiments, the method includes, by the one or more processors: determining a confidence score based on, at least in part, the quantity of the one or more sensed objects located within the bounding area, determining a lane score based on the confidence score, and comparing the lane score to a lane score threshold, wherein operation of the vehicle is maintained in the current lane in response to the lane score being greater than the lane score threshold.

In various embodiments, the method includes determining the confidence score is based on, at least on of, a time of detection of the one or more sensed objects, object-to-object position correlation of the one or more sensed objects, the quantity of the one or more sensed objects located within the bounding area, and a pattern defined by the one or more sensed objects.

In various embodiments, the method includes obtaining, from one or more cameras onboard the vehicle, vision data that includes the portion of the adjacent lane, wherein the size of the bounding area is based on, at least in part, the map data, the current position of the vehicle, and the vision data.

In various embodiments, the method includes enabling, by the one or more processors, an autonomous lane change in response to a determination that the unclassified hazard is not present in the adjacent lane.

In various embodiments, the method includes dynamically adjusting a shape of the bounding area to correlate with the geometry of the adjacent lane.

In various embodiments, the one or more sensors includes a radar sensor and the sensor data includes radar point cloud data.

A system is provided for detecting and mitigating unclassified hazards for a driver assistance system of a vehicle. In one embodiment, the system includes a data storage device comprising map data that includes information relating to a road including lane geometry, one or more sensors of the vehicle configured to generate sensor data indicative of one or more sensed objects in proximity to the vehicle, and a controller in operable communication with the data storage device and the one or more sensors. The controller is configured to, by one or more processors thereof, receive the map data and the sensor data, filter the sensor data to omit at least one of the one or more sensed objects located outside of a bounding area that includes a portion of an adjacent lane next to a current lane in which the vehicle is operating, the bounding area having a size determined by, at least in part, the map data and a current position of the vehicle, determine whether an unclassified hazard is present in the adjacent lane based on, at least in part, a quantity of the one or more sensed objects located within the bounding area, and maintain operation of the vehicle in the current lane in response to a determination that the unclassified hazard is present in the adjacent lane.

In various embodiments, the controller is configured to, by the one or more processors, prevent an autonomous lane change by the driver assistance system in response to a determination that the unclassified hazard is present in the adjacent lane.

In various embodiments, the controller is configured to, by the one or more processors, produce a normalized bounding area that includes an area that is smaller than an area of the bounding area based on a normalized error of the one or more sensors.

In various embodiments, the controller is configured to, by the one or more processors: determine a confidence score based on, at least in part, the quantity of the one or more sensed objects located within the bounding area, determine a lane score based on the confidence score, and compare the lane score to a lane score threshold, wherein operation of the vehicle is maintained in the current lane in response to the lane score being greater than the lane score threshold.

In various embodiments, the controller is configured to, by the one or more processors, determine the confidence score based on, at least one of, a time of detection of the one or more sensed objects, object-to-object position correlation of the one or more sensed objects, the quantity of the one or more sensed objects located within the bounding area, and a pattern defined by the one or more sensed objects.

In various embodiments, the controller is configured to, by the one or more processors: obtain from one or more cameras onboard the vehicle, vision data that includes the portion of the adjacent lane, and wherein the size of the bounding area is based on, at least in part, the map data, the current position of the vehicle, and the vision data.

In various embodiments, the controller is configured to, by the one or more processors, enable the autonomous lane change in response to a determination that the unclassified hazard is not present in the adjacent lane.

In various embodiments, the controller is configured to, by the one or more processors, dynamically adjust a shape of the bounding area to correlate with the geometry of the adjacent lane.

In various embodiments, the one or more sensors includes a radar sensor and the sensor data includes radar point cloud data.

A vehicle is provided that includes a data storage device comprising map data that includes information relating to a road including lane geometry, one or more radar sensors of the vehicle configured to generate radar point cloud data that includes one or more radar objects in proximity to the vehicle, and a controller in operable communication with the data storage device and the one or more radar sensors. The controller configured to, by one or more processors thereof: receive the map data and the radar point cloud data, filter the radar point cloud data to omit at least one of the one or more radar objects located outside of a bounding area that includes a portion of an adjacent lane next to a current lane in which the vehicle is operating, the bounding area having a size determined by, at least in part, the map data and a current position of the vehicle, wherein a shape of the bounding area is dynamically adjusted to correlate with the lane geometry, produce a normalized bounding area that includes an area that is smaller than an area of the bounding area based on a normalized error of the one or more radar sensors, determine a confidence score based on, at least one of, a time of detection of the one or more radar objects, object-to-object position correlation of the one or more radar objects, a quantity of the one or more radar objects located within the bounding area, and/or a pattern defined by the one or more radar objects, determine a lane score based on the confidence score, compare the lane score to a lane score threshold, determine whether an unclassified hazard is present in the adjacent lane based on the lane score, wherein the unclassified hazard is determined to be present in response to the lane score being greater than the lane score threshold, operate the vehicle based on the determination of whether the unclassified hazard is present in the adjacent lane, including: prevent an autonomous lane change in response to a determination that the unclassified hazard is present in the adjacent lane, and enable an autonomous lane change in response to a determination that the unclassified hazard is not present in the adjacent lane.

In various embodiments, the controller of the vehicle is configured to, by the one or more processors: obtain from one or more cameras onboard the vehicle, vision data that includes the portion of the adjacent lane, wherein the size of the bounding area is based on, at least in part, the map data, the current position of the vehicle, and the vision data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
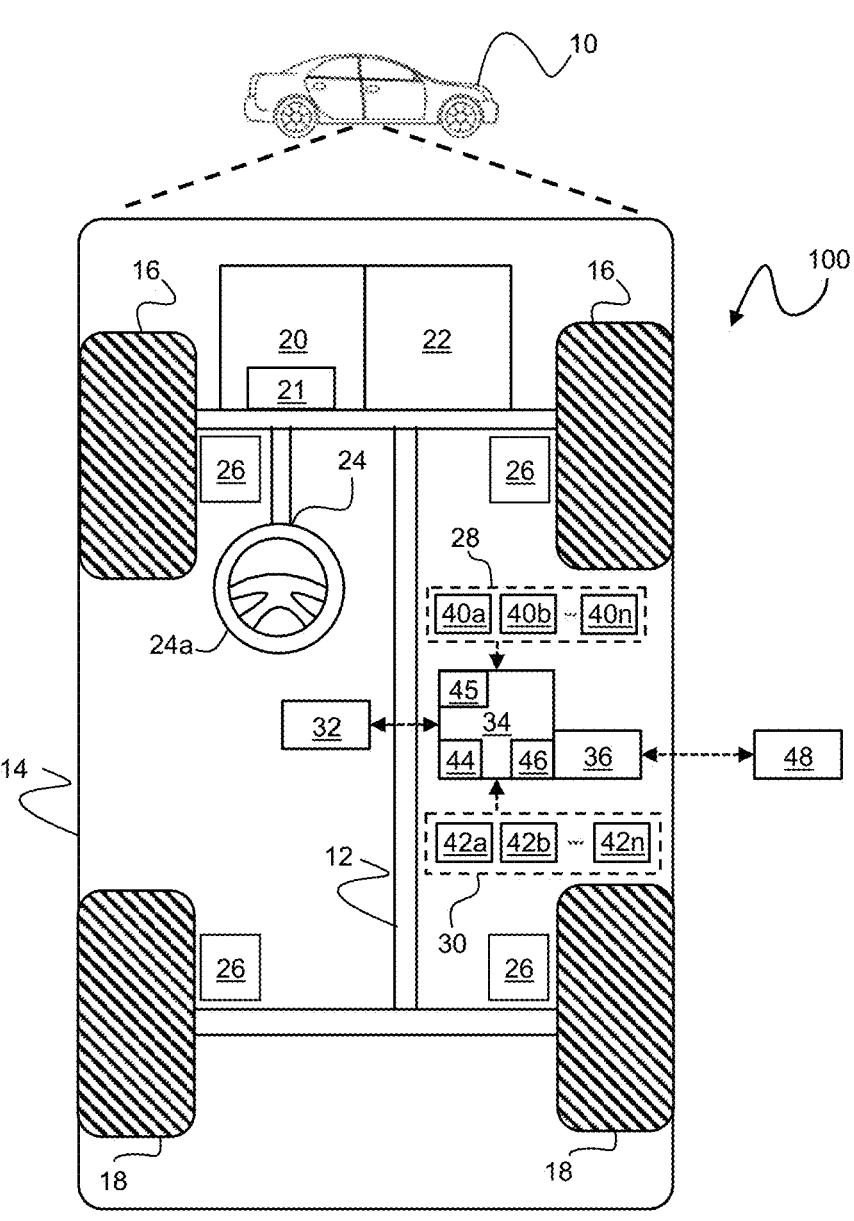
FIG. 1 is a functional block diagram illustrating an autonomous vehicle control system for a vehicle in accordance with various implementations.

Referring now to FIG. 1, in accordance with one or more implementations, an autonomous vehicle control system 100 determines a plan for autonomously operating a vehicle 10 along a route in a manner that accounts for unclassified objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10. In various implementations, the vehicle control system 100 includes an unclassified hazard detection system configured to detect unclassified hazards by, at least in part, correlating map data with radar point cloud data to promote safe autonomous lane change maneuvers.

In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a motorcycle and/or one or more other types of vehicles. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame and substantially enclose components of the vehicle 10. The wheels 16-18 are each rotationally coupled to the chassis 12 near a respective corner of the body 14.

In exemplary implementations, the vehicle 10 is an autonomous vehicle or is otherwise configured to support one or more autonomous operating modes, and the control system 100 is incorporated into the vehicle 10. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communications system 36. The propulsion system 20 may, in various implementations, include an internal combustion engine, an electric machine such as a traction motor, and/or a fuel cell propulsion system. The transmission system 22 is configured to transmit power from the propulsion system 20 to the wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the wheels 16-18. While depicted as including a steering wheel for illustrative purposes, in some embodiments contemplated within the scope of the present disclosure, the steering system 24 may not include the steering wheel 24a.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one exemplary embodiment, the storage device 32 comprises a program product from which a computer readable memory device can receive a program that executes one or more embodiments of one or more processes of the present disclosure, such as the steps of the process discussed further below in connection with FIG. 4. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

In various implementations, one or more instructions of the controller 34 are embodied in the control system 100 (e.g., in data storage element 46) and, when executed by the processor 44, cause the processor 44 to obtain data captured or generated from imaging and ranging devices (e.g., of the sensors 28, 40) and utilize the captured environmental data to determine commands for autonomously operating the vehicle 10, as described in greater detail below.

Still referring to FIG. 1, in exemplary implementations, the communication system 36 is configured to wirelessly communicate information to and from other entities 48 over a communication network, such as but not limited to, other vehicles ("V2V" communication,) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
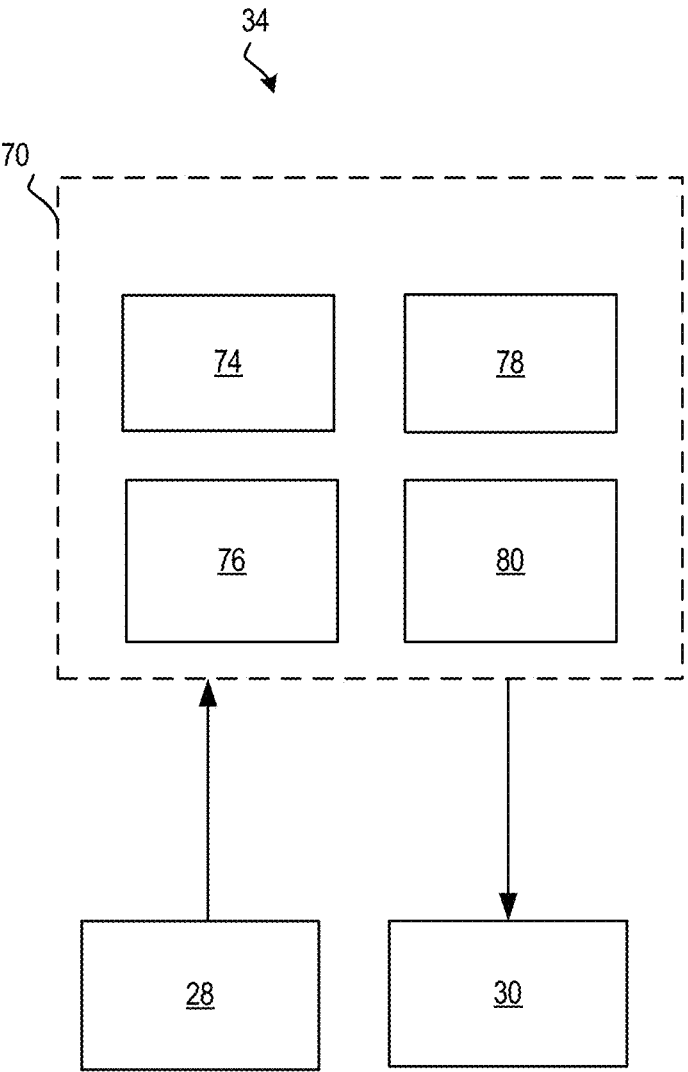
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle 10 as it traverses along a route. The motion planning module includes a longitudinal solver module that generates a longitudinal motion plan output for controlling the movement of the vehicle 10 along the route in the general direction of travel, for example, by causing the vehicle 10 to accelerate or decelerate at one or more locations in the future along the route to maintain a desired speed or velocity. The motion planning module also includes a lateral solver module that generates a lateral motion plan output for controlling the lateral movement of the vehicle 10 along the route to alter the general direction of travel, for example, by steering the vehicle 10 at one or more locations in the future along the route (e.g., to maintain the vehicle 10 centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle 10, and the lateral solver module attempts to optimize one or more of the steering angle, the rate of change of the steering angle, and the acceleration or second derivative of the steering angle, alternatively referred to herein as the lateral jerk of the vehicle 10. In this regard, the steering angle can be related to the curvature of the path or route, and any one of the steering angle, the rate of change of the steering angle, and the acceleration or second derivative of the steering angle can be optimized by the lateral solver module, either individually or in combination.

In exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 includes or otherwise implements a lane change coordinator that analyzes route information (if available) in addition to data or other information from the sensor fusion system 74, the positioning system 76 and potentially other modules or systems to determine whether or not to initiate and execute a lane change from a current lane of travel to an adjacent lane of travel, for example, based on presence of slower moving traffic within the current lane of travel ahead of the vehicle 10 (e.g., to overtake or pass another vehicle), whether or not the current lane is ending or merging into an adjacent lane, whether a lane change is required to maintain travel along the desired route, and/or the like. In this regard, the lane change coordinator may automatically determine when to initiate a lane change and automatically configure the lateral solver module and/or the motion planning module to generate a corresponding lateral plan to change lanes in the desired manner and provide the lateral plan to the vehicle control system 80, which automatically generates corresponding control signals for autonomously controlling the vehicle actuators 30 to maneuver the vehicle 10 and execute the lane change.

Figure 3:
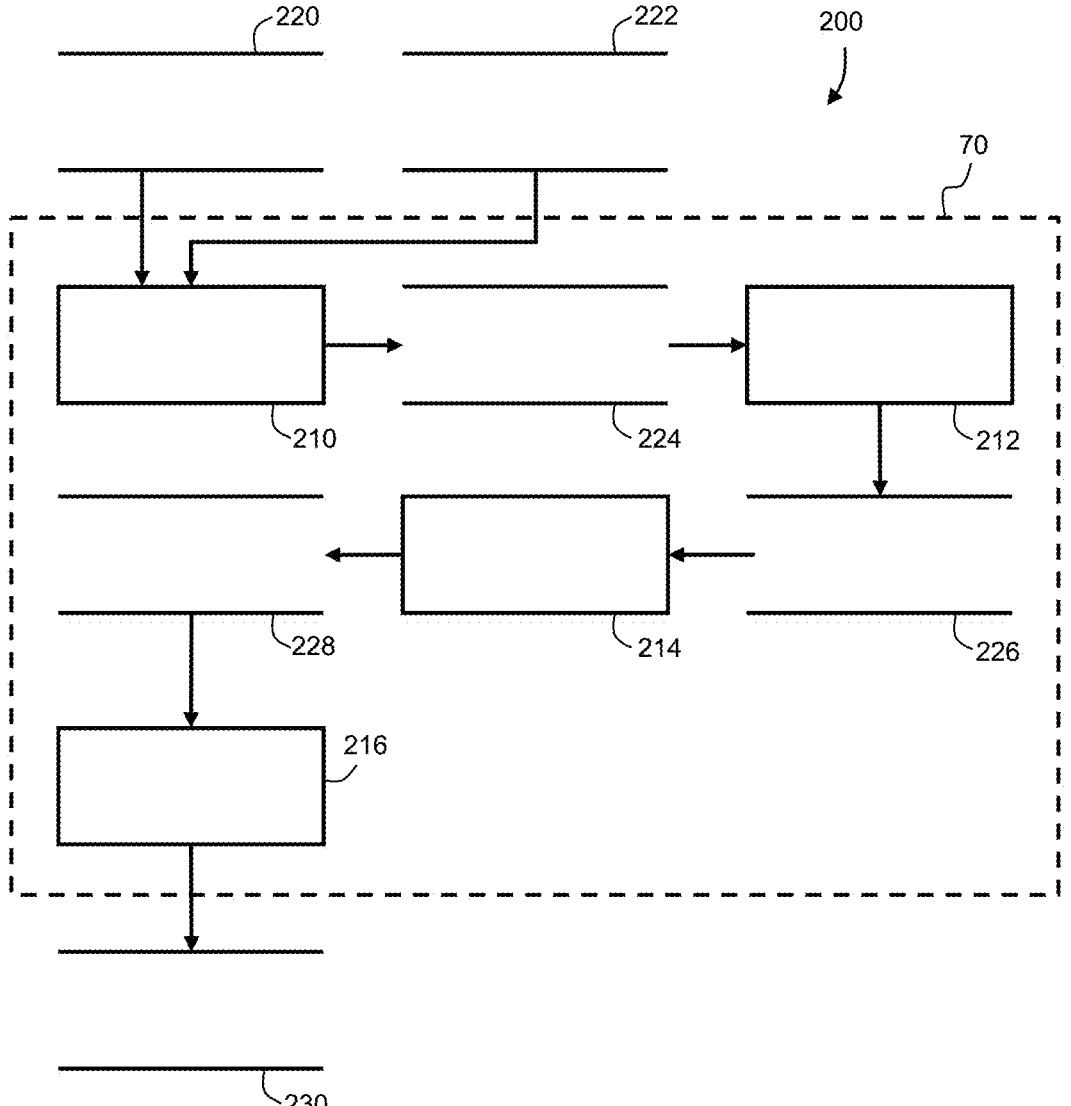
FIG. 3 is a dataflow diagram of an autonomous vehicle control system that includes an unclassified hazard detection system suitable for use with the ADS of FIG. 2 in the autonomous vehicle control system of FIG. 1 according to one or more aspects described herein.

Referring now to FIG. 3, with continued reference to FIGS. 1-2, a dataflow diagram illustrates elements of an unclassified hazard detection system 200 of the ADS 70 of FIG. 2 as implemented by the controller 34 of FIG. 1 in accordance with various embodiments. As can be appreciated, various embodiments of the unclassified hazard detection system 200 according to the present disclosure may include any number of modules embedded within the controller 34 which may be combined and/or further partitioned to similarly implement systems and methods described herein. Furthermore, inputs to the unclassified hazard detection system 200 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various embodiments, the unclassified hazard detection system 200 includes a localization module 210, a bounding area module 212, a hazard detection module 214, and a control module 216.

In various embodiments, the localization module 210 receives as input map data 220 retrieved from the data storage device 32 or the computer readable storage device or media 46. The map data 220 includes various data indicating various characteristics of the road including road geometry and road curvature. In various embodiments, the localization module 210 receives as input sensor data 222 generated by the sensor system 28. The sensor data 222 includes various data indicating camera objects including lane markings and radar objects.

The localization module 210 performs localization to known road geometry. In various embodiments, the localization may include determining a location of the vehicle 10 based on a GPS signal. In various embodiments, the localization may include determining a lane of the road in which the vehicle 10 is located based on the lane markings. In various embodiments, the localization may include determining an approximate width of the lanes of the road based on the lane markings. The localization module 210 generates localization data 224 that includes various data indicating, for example, the position of the vehicle 10, the lane in which the vehicle 10 is located, the approximate width of the lanes of the road, and/or the locations of the radar objects that are on the road (i.e., may eliminate or omit any radar objects located off the road).

In various embodiments, the bounding area module 212 receives as input the localization data 224 generated by the localization module 210. The bounding area module 212 determines a region of interest in a lane of the road, such as a lane laterally adjacent to the lane in which the vehicle 10 is located, and establishes a bounding box or area having boundaries associated with the lateral extents of the region of interest. In various embodiments, the region of interest corresponds to a portion of the road that is representative of portions of the road that would be physically entered during an autonomous lane change of the vehicle 10 wherein the presence of a persistent object (e.g., concrete barrier, crack in the road, etc.) within such portion of the road may represent a hazard to the vehicle 10 if the autonomous lane change is performed. In various embodiments, the size or lateral dimension (e.g., width) of the bounding area may be determined, at least in part, by a predetermined standard deviation of noise attributed to a radar system of the vehicle 10 that generated the radar objects of the sensor data 222. In various embodiments, the bounding area may have a dynamic shape that is continuously adjusted based on, at least in part, the curvature of the road as determined based on the map data 220. The bounding area module 212 eliminates or omits at least one, some, or all of the radar objects that are located outside of the boundaries of the bounding area. In various embodiments, the bounding area may be normalized one or more times to provide narrower bounding areas to create an adjusted distribution of the radar objects. In various embodiments, the bounding area may be normalized to provide a normalized line in response to a repeating pattern of radar objects in laterally similar positions along an extended longitudinal region which may represent a lateral position of an inferred hazard (e.g., FIG. 9). The bounding area module 212 generates bounding area data 226 that includes various data indicating the established bounding area and the quantity and location of the radar objects within the bounding area.

In various embodiments, the hazard detection module 214 receives as input the bounding area data 226 generated by the bounding area module 212. The hazard detection module 214 dynamically determines a confidence level associated with a likelihood that a hazard exists within the bounding area based, at least in part, on the quantity of the radar objects located within the bounding area at a given time. In various embodiments, the confidence level may be expressed as a numerical value or percentage (e.g., 0 to 100 percent confidence that a hazard exists). The hazard detection module 214 then generates and dynamically updates a lane score for the desired lane based, at least in part, on the confidence level. In various embodiments, the lane score may be expressed as a numerical value (e.g., between 100 and −100). In various embodiments, the lane score may be expressed as a word, phrase, and/or category (e.g., between "highly desired" and "highly undesired"). In various embodiments, the lane score may be determined as a numerical value and converted to a word, phrase, and/or category. For example, if the confidence level is 100 percent (i.e., very high or substantially certain), the lane score may be −100 (very low) which may be converted to "highly undesired." In various embodiments, a relationship between the confidence level and the lane score may be weighted and/or exponential. The hazard detection module 214 generates hazard detection data 228 that includes various data indicating the lane score for one or more lanes of the road, such as the desired lane.

In various embodiments, the control module 216 receives as input the hazard detection data 128 generated by the hazard detection module 214. The control module 216 generates instructions configured to allow and/or restrict lane change maneuvers based on the lane score. In various embodiments, the instructions are configured to enable and/or disable an autonomous lane change. The control module 216 generates control data 230 that includes various data indicating the instructions. The control module 216 may transmit the control data 230 to the vehicle control system 80. In some embodiments, the control data 230 may cause the vehicle control system 80 and a lane change system thereof operate normally in response to a sufficiently high lane score (i.e., a low confidence of hazard existence), and may suspend, disable, or prevent an automated lane change by the lane change system in response to a sufficiently low lane score (i.e., a high confidence of hazard existence), at least in a direction of the inferred hazard. For example, in response to a sufficiently low lane score, the control data 230 may cause operation of the vehicle 10 to be maintained in a current lane in which the vehicle 10 is traveling until the lane score raises to an extent such that the autonomous lane change may be safely performed. Notably, in some embodiments, prevention of the lane change into the adjacent lane that has a low lane score may not prevent the vehicle 10 from autonomously changing lanes into another lane that has a sufficiently high lane score.

In various embodiments, the unclassified hazard detection system 200 may be operating continuously during operation of the vehicle 10, continuously during operation of the lane change system, or in response to a request for an autonomous lane change by the lane change system.

Figure 4:
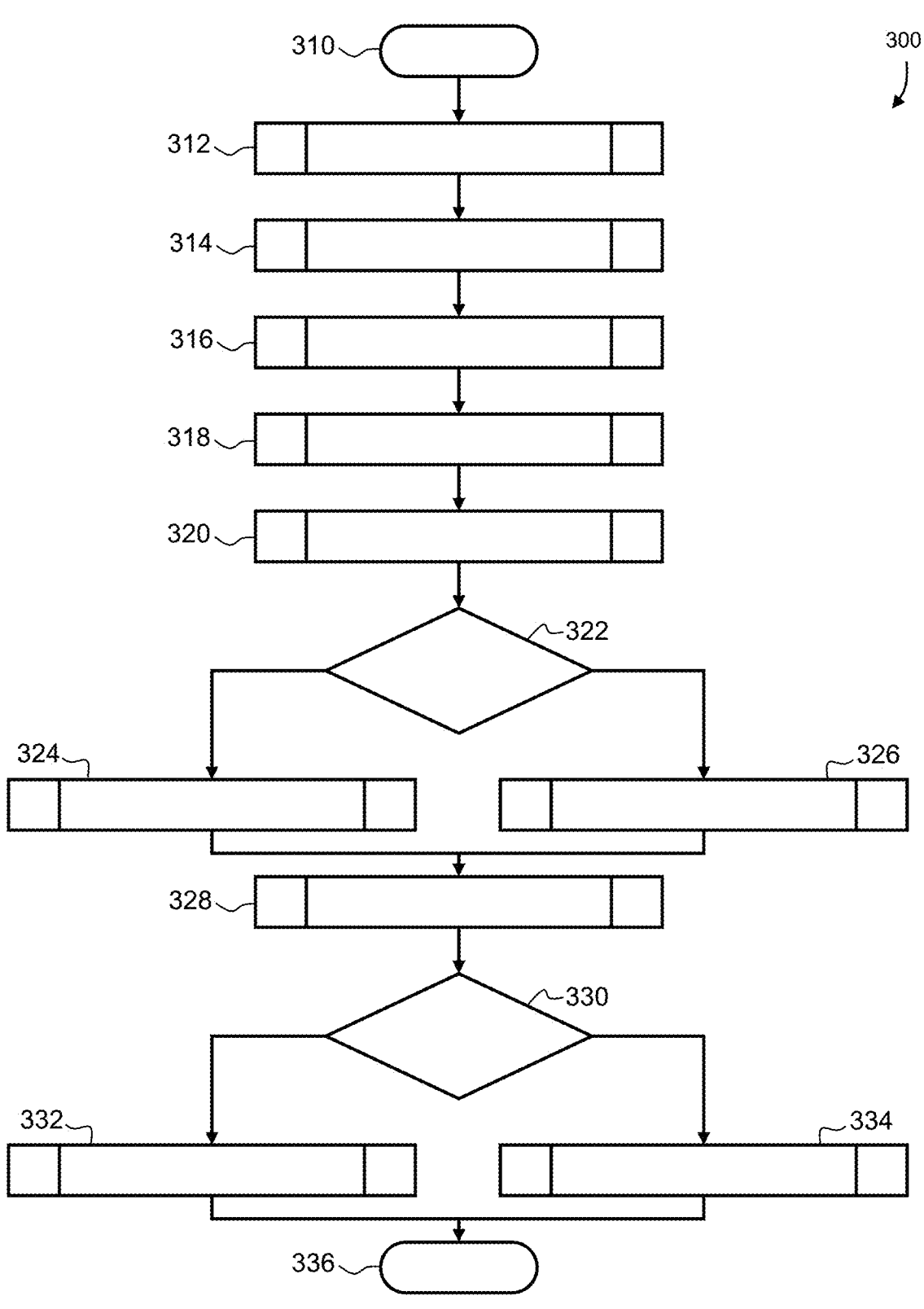
FIG. 4 depicts a flow diagram of an unclassified hazard detection process suitable for implementation by the ADS of FIG. 2 in the autonomous vehicle control system of FIG. 1 according to one or more aspects described herein.

FIG. 4 depicts an exemplary implementation of an unclassified hazard detection method 300 suitable for implementation by one or more control modules onboard a vehicle (e.g., by the unclassified hazard detection system 200 in conjunction with the ADS 70 supported by the controller 34 in the vehicle 10) to autonomously operate one or more actuators onboard the vehicle to change lanes in a manner that is influenced by detection of unclassified hazards in lateral lanes. For illustrative purposes, the following description may refer to elements mentioned above in connection with FIGS. 1-3. While portions of the unclassified hazard detection method 300 may be performed by different elements of a vehicle system, for purposes of explanation, the subject matter may be primarily described herein in the context of the unclassified hazard detection method 300 being primarily performed by the unclassified hazard detection system 200 and the ADS 70 implemented by the controller 34 associated with the vehicle 10.

Nonlimiting examples represented in FIGS. 5-13 will be referenced to illustrate various aspects of the method 300. In these examples, a vehicle 510 is traveling on a road 500 that includes five lanes including, from right to left, a first lane 501, a second lane 502, a third lane 503, a fourth lane 504, and a fifth lane 505. In FIGS. 5-7 and 12, the vehicle 510 is located in the third lane 503 and, in FIGS. 8-10 and 13, the vehicle 510 is located in the first lane 501.

In exemplary implementations, the unclassified hazard detection method 300 may start at 310. At 312, the method 300 may include receiving external object-related sensor data from one or more sensing devices 28, 40 of the vehicle 10, such as radar objects (i.e., targets/returns) from a radar system. In various embodiments, the radar objects may be stored as a radar point cloud.

At 314, the method 300 may include receiving map data from a data storage device (e.g., data storage device 32 or the computer readable storage device or media 46) that includes road characteristics such as road geometry and road curvature. Optionally, the method 300 may include, at 314, receiving road characteristic-related sensor data from one or more sensing devices 28, 40 of the vehicle 10, such as video from a camera system. In various embodiments, the road characteristic-related sensor data may be analyzed to determine a current lane of the road in which the vehicle 10 is located based on the lane markings. In various embodiments, the road characteristic-related sensor data may be analyzed to determine an approximate width of the lanes of the road based on the lane markings. In various embodiments, the method 300 may include, at 314, receiving lane markings, identification of a current lane being traveled by the vehicle 10, and/or lane widths as determined by another system of the vehicle 10. In various embodiments, the method 300 may include establishing a fused lane boundary based on, at least in part, a GPS position of the vehicle 10, map-based road characteristics and curvature, and camera-based perceived road boundaries.

At 316, the method 300 may include establishing a bounding area having boundaries associated with the lateral extents of a region of interest in a lane of the road, such as a lane laterally adjacent to the current lane in which the vehicle 10 is located. In various embodiments, the size of the bounding area may be determined, at least in part, by a predetermined standard deviation of noise attributed to a radar system of the vehicle 10 that generated the radar objects. In various embodiments, the bounding area may have a dynamic shape that is continuously adjusted based on, at least in part, the curvature of the road.

Figures 5, 6, 7:
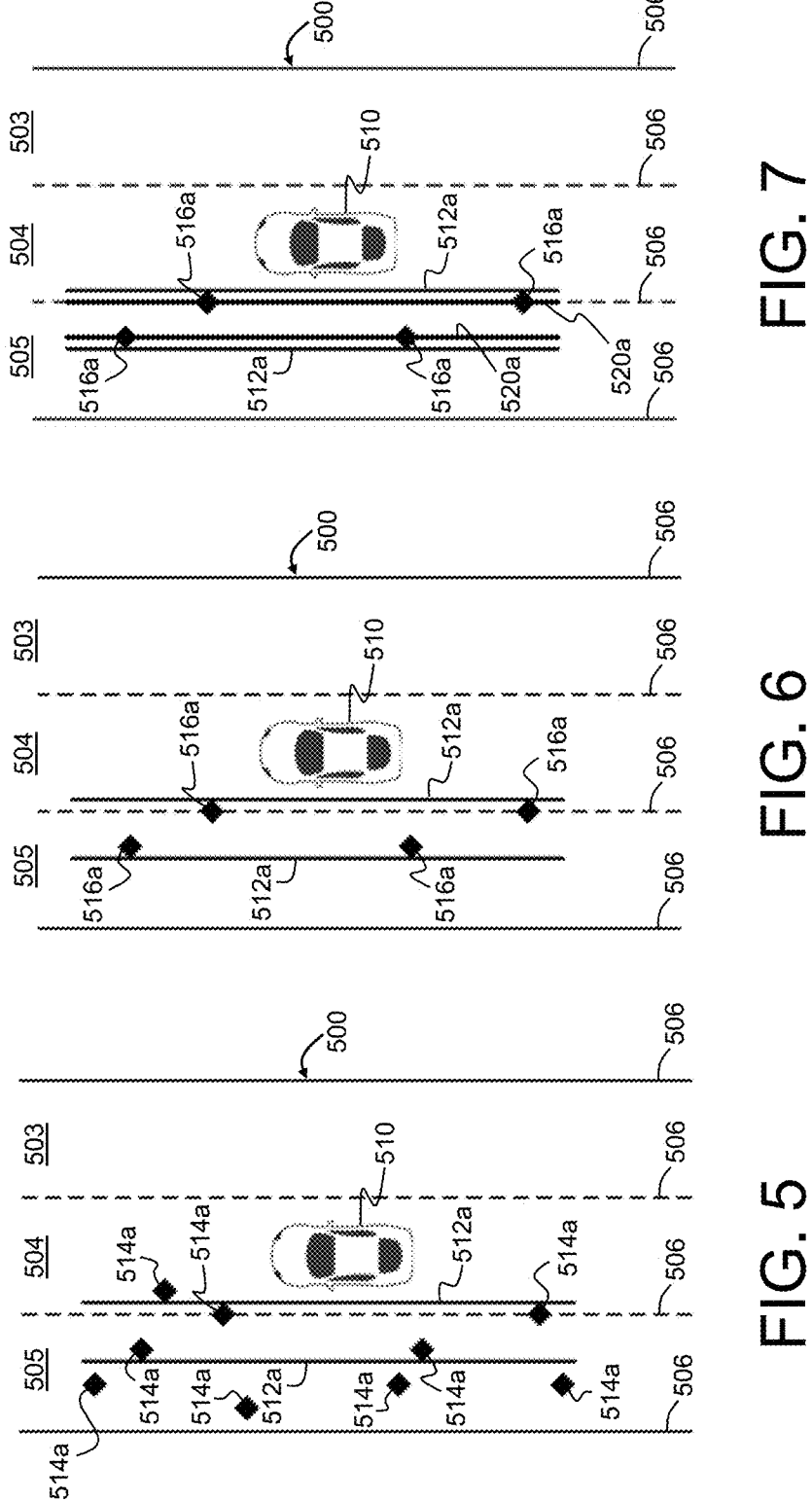
FIGS. 5-10 depict exemplary scenarios for example implementations of the unclassified hazard detection process of FIG. 4 according to one or more aspects described herein.
Figures 8, 9, 10:
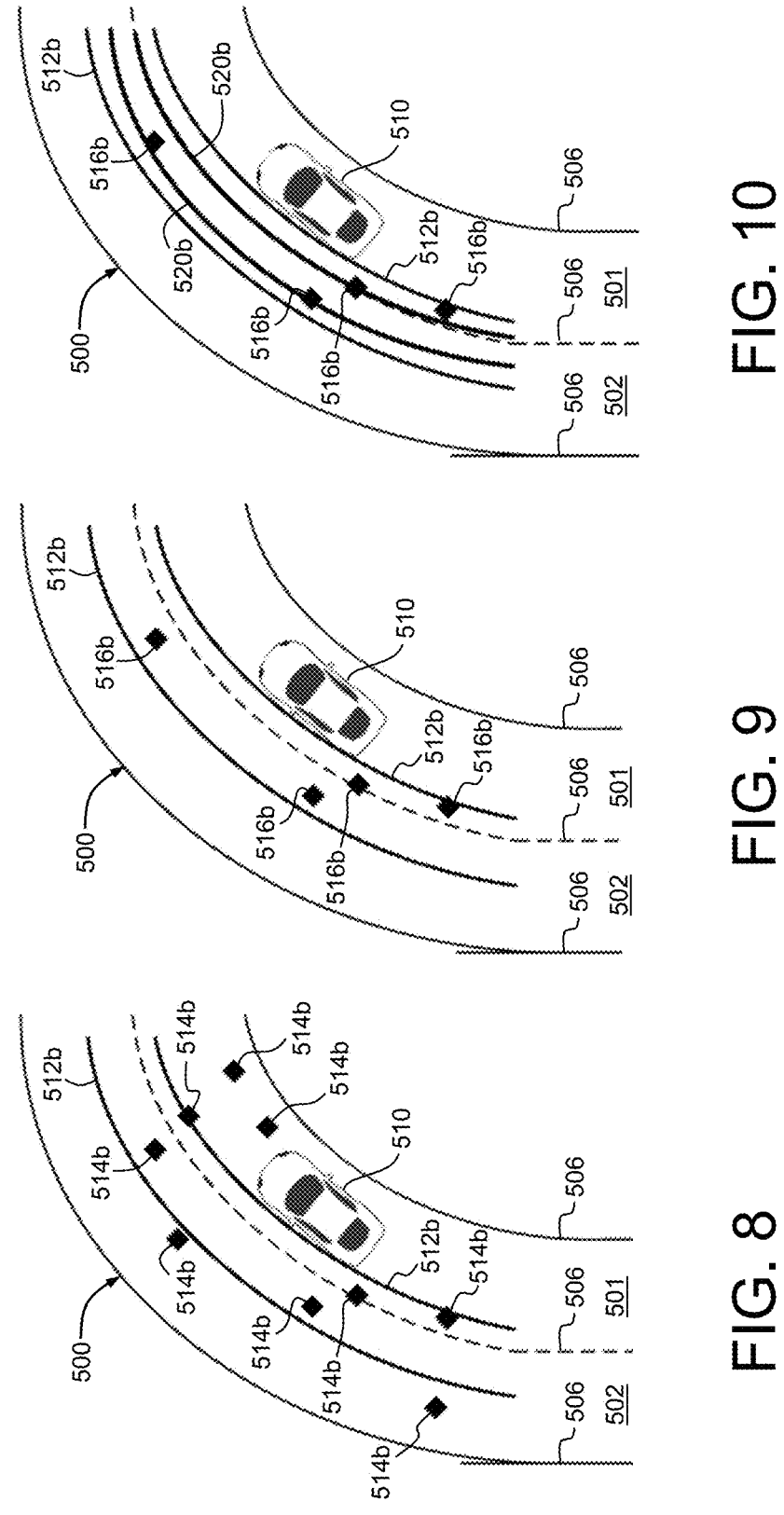

For example, in FIG. 5, a first bounding area defined by boundaries 512a are established laterally left of the vehicle 510 and, in FIG. 8, a second bounding area defined by boundaries 512b are established laterally left of the vehicle 510. Notably, the shapes of the first and second bounding areas have been adjusted based on the curvature of the road 500. For example, the second bounding area curves to the right due to the curvature of the first lane 501 and the second lane 502 of the road 500. Radar objects 514 are shown on the road 500 in regions adjacent to the vehicle 510.

At 318, the method 300 may include filtering the radar objects to eliminate or omit any radar objects that are located outside of the bounding area. At 320, the method 300 may include normalizing the bounding area one or more times to provide a narrower bounding area and thereby create an adjusted distribution of the radar objects. In various embodiments, one or more radar objects located outside of the normalized bounding area may be eliminated or omitted.

For example, in FIGS. 6 and 9, the radar objects 514 of FIGS. 5 and 8 have been filtered such that only certain radar objects 516 remain which are located within the bounding areas 512. In these examples, there are four remaining radar objects 516a within the first bounding area and four remaining radar objects 516b within the second bounding area. In FIGS. 7 and 10, the bounding areas 512 are normalized based on the locations of the remaining radar objects 516 to provide normalized bounding areas 520.

At 322, the method 300 may include determining a confidence level associated with a likelihood that a hazard exists within the bounding area based, at least in part, on the quantity of the radar objects located within the bounding area at a given time. Depending on the quantity of the radar objects within the bounding area and/or a grouping of the radar objects within the bounding area, the confidence level may be increased or decreased dynamically. For example, an increase in a number of radar objects within the normalized bounding area, a pattern of the radar objects within the normalized bounding area, and/or a persistence (i.e., recurrence) of radar objects within the normalized bounding area over time may result in an increase in the confidence level at 324. In contrast, a decrease in the number of radar objects within the normalized bounding area and/or a lack of persistence (i.e., recurrence) of radar objects within the normalized bounding area over time may result in a decrease in the confidence level at 326. In various embodiments, the confidence level may increase exponentially. For example, the confidence level may increase at an increasing rate in response to, for example, a continued persistence of the radar objects within the normalized bounding area. In various embodiments, the confidence level may decrease or decay relatively slowly over time in response to, for example, a decrease in the persistence of the radar objects within the normalized bounding area, rather than decreasing in a sharp drop or a step change manner.

At 328, the method 300 may include determining or establishing a lane score based on, at least in part, the confidence level. In various embodiments, the lane score may be dynamically updated based on the confidence level over time. The lane score may have various relationships to the confidence level such as, but not limited to, an exponential relationship. In various embodiments, the lane score may be a composite based on the confidence level and one or more additional factors. In various embodiments, the lane score may increase exponentially. For example, the lane score may increase at an increasing rate in response to, for example, a persistence of the confidence level. In various embodiments, the lane score may decrease or decay at a predetermined rate over time in response to, for example, a decrease in the persistence of the confidence level, rather than decreasing in a sharp drop or a step change manner.

Figure 11:
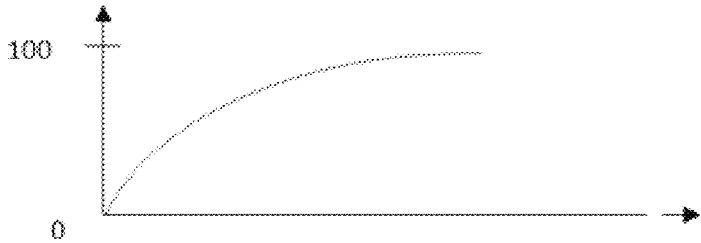
FIG. 11 includes plots illustrating an exemplary relationship between a confidence level and a corresponding lane score as determined by the unclassified hazard detection process of FIG. 4 according to one or more aspects described herein.
Figure 11:
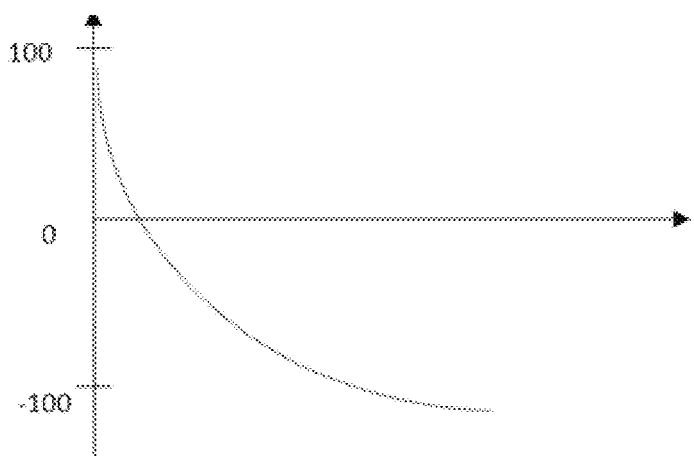

For example, FIG. 11 presents a first (upper) plot illustrating a confidence level that increases over time and a second (lower) plot illustrating a lane score that decreases over time based on the confidence level of the first plot. The relationship represented in FIG. 11 between the confidence level of the first plot and the lane score of the second plot is nonlimiting. In the first plot, the y-axis is a confidence level percentage (%) and the x-axis is time (t) in seconds. In the second plot, the y-axis is a unitless lane score and the x-axis is time (t) in seconds.

At 330, the lane score may be compared to a preprogramed lane score threshold. At 332, the method 300 may include suspending or preventing a lane change maneuver in response to the lane score exceeding the lane score threshold. At 334, the method 300 may include enabling or allowing a lane change maneuver in response to the lane score being less than the lane score threshold. The method 300 may end at 336.

Figures 12, 13:
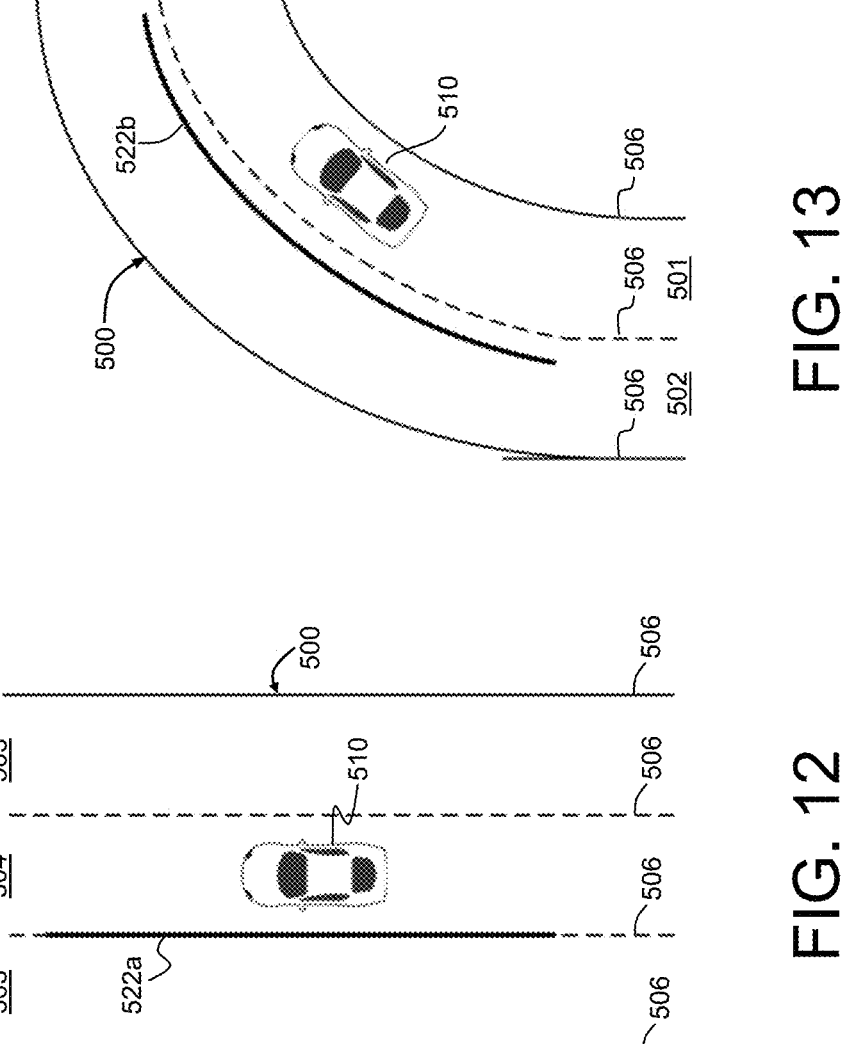
FIGS. 12 and 13 depict exemplary scenarios for an example implementation of the unclassified hazard detection process of FIG. 4 according to one or more aspects described herein.

In various embodiments, the bounding area may be normalized to provide a normalized line in response to a repeating pattern of radar objects in laterally similar positions along an extended longitudinal region which may represent a lateral position of an inferred hazard. For example, FIG. 12 represents a first normalized line 522a adjacent to the vehicle 510 and FIG. 13 represents a second normalized line 522b adjacent to the vehicle 510.

The systems and methods disclosed herein provide various benefits over certain existing systems and methods. For example, various autonomous driving systems perform object and/or hazard detection by consuming sensor input to classify an object. While useful in many situations, classifying objects may require specific sensors and/or may require significant computational resources. Furthermore, issues may arise when objects are present that are not within one of the preprogrammed classification categories. The systems and methods disclosed herein address these issues by providing for detection and mitigation of unclassified hazards by correlating map data and sensor data (e.g., radar objects) to detect, determine, and/or mitigate unclassified hazards present on a road and suspending and/or enabling one or more autonomous features (e.g., automatic lane change maneuvers) to avoid such hazards. By combining implicit knowledge of road contained in the map data with sensor data from the vehicle, the systems and methods disclosed herein are capable of providing multi-domain, multi-sensor fusion interpretation based on, for example, a single sensor data (e.g., radar). In various implementations, it is unnecessary for the systems and methods to classify the hazards. For example, if the systems and methods are operating to, for example, enable or suspend automatic lane change maneuvers, knowledge of the likelihood of a potential, unclassified hazard in a lateral lane is sufficient to determine whether it is desirable for the vehicle to change from a safe position (i.e., the current lane) to a potentially unsafe position (e.g., the desired lane). By detecting potential hazards without classification thereof, the systems and methods disclosed herein may promote safe operation of the vehicle and simultaneously reduce the type or quantity of sensors and/or computational requirements necessary for operation of the ADS 70.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting and mitigating unclassified hazards for a driver assistance system of a vehicle, comprising:

obtaining, from a data storage device, map data that includes information relating to a road including lane geometry;

obtaining, from a radar sensor of the vehicle, radar point cloud data that includes radar objects in proximity to the vehicle;

filtering, with one or more processors of a controller, the radar point cloud data to omit at least one of the radar objects located outside of a bounding area that includes a portion of an adjacent lane next to a current lane in which vehicle is operating, the bounding area having a size determined by, at least in part, the map data and a current position of the vehicle;

determining and dynamically updating a confidence score based on, at least in part, the quantity of the radar objects located within the bounding area at a given time;

determining and dynamically updating a lane score based, at least in part, on the confidence score, wherein the lane score increases at an increasing rate in response to a persistence of the confidence score and decreases at a predetermined rate over time in response to a decrease in the persistence of the confidence score;

comparing the lane score to a lane score threshold;

determining, with the one or more processors, whether an unclassified hazard is present in the adjacent lane based on, at least in part, a quantity of the radar objects located within the bounding area; and maintaining, with the one or more processors, operation of the vehicle in the current lane in response to a determination that the unclassified hazard is present in the adjacent lane, wherein operation of the vehicle is maintained in the current lane in response to the lane score being greater than the lane score threshold.

2. The method of claim 1, further comprising preventing, with the one or more processors, an autonomous lane change by the driver assistance system in response to a determination that the unclassified hazard is present in the adjacent lane.

3. The method of claim 1, further comprising, by the one or more processors, producing a normalized bounding area that includes an area that is smaller than an area of the bounding area based on a normalized error of the radar sensor.

4. The method of claim 1, wherein determining the confidence score is based on a time of detection of the radar objects, object-to-object position correlation of the radar objects, the quantity of the radar objects located within the bounding area, and a pattern defined by the radar objects.

5. The method of claim 1, further comprising:

obtaining, from one or more cameras onboard the vehicle, vision data that includes the portion of the adjacent lane, wherein the size of the bounding area is based on, at least in part, the map data, the current position of the vehicle, and the vision data.

6. The method of claim 1, further comprising enabling, by the one or more processors, an autonomous lane change in response to a determination that the unclassified hazard is not present in the adjacent lane.

7. The method of claim 1, further comprising dynamically adjusting a shape of the bounding area to correlate with a geometry of the adjacent lane.

8. A system for detecting and mitigating unclassified hazards for a driver assistance system of a vehicle, comprising:

a data storage device comprising map data that includes information relating to a road including lane geometry;

a radar sensor of the vehicle configured to generate radar point cloud data indicative of radar objects in proximity to the vehicle; and a controller in operable communication with the data storage device and the radar sensor, the controller configured to, by one or more processors thereof:

receive the map data and the radar point cloud data;

filter the radar point cloud data to omit at least one of the radar objects located outside of a bounding area that includes a portion of an adjacent lane next to a current lane in which the vehicle is operating, the bounding area having a size determined by, at least in part, the map data and a current position of the vehicle;

determine and dynamically update a confidence score based on, at least in part, the quantity of the radar objects located within the bounding area at a given time;

determine and dynamically update a lane score based, at least in part, on the confidence score, wherein the lane score increases at an increasing rate in response to a persistence of the confidence score and decreases at a predetermined rate over time in response to a decrease in the persistence of the confidence score;

determine whether an unclassified hazard is present in the adjacent lane based on, at least in part, the lane score, wherein the unclassified hazard is determined to be present in response to the lane score being greater than the lane score threshold; and maintain operation of the vehicle in the current lane in response to a determination that the unclassified hazard is present in the adjacent lane.

9. The system of claim 8, wherein the controller is configured to, by the one or more processors, prevent an autonomous lane change by the driver assistance system in response to a determination that the unclassified hazard is present in the adjacent lane.

10. The system of claim 8, wherein the controller is configured to, by the one or more processors, produce a normalized bounding area that includes an area that is smaller than an area of the bounding area based on a normalized error of the radar sensor.

11. The system of claim 10, wherein the controller is configured to, by the one or more processors, determine the confidence score based on a time of detection of the radar objects, object-to-object position correlation of the radar objects, the quantity of the radar objects located within the bounding area, and a pattern defined by the radar objects.

12. The system of claim 8, wherein the controller is configured to, by the one or more processors:

obtain from one or more cameras onboard the vehicle, vision data that includes the portion of the adjacent lane; and wherein the size of the bounding area is based on, at least in part, the map data, the current position of the vehicle, and the vision data.

13. The system of claim 8, wherein the controller is configured to, by the one or more processors, enable the autonomous lane change in response to a determination that the unclassified hazard is not present in the adjacent lane.

14. The system of claim 8, wherein the controller is configured to, by the one or more processors, dynamically adjust a shape of the bounding area to correlate with a geometry of the adjacent lane.

15. A vehicle, comprising:

a data storage device comprising map data that includes information relating to a road including lane geometry;

one or more radar sensors of the vehicle configured to generate radar point cloud data that includes radar objects in proximity to the vehicle; and a controller in operable communication with the data storage device and the one or more radar sensors, the controller configured to, by one or more processors thereof:

receive the map data and the radar point cloud data;

filter the radar point cloud data to omit at least one of the radar objects located outside of a bounding area that includes a portion of an adjacent lane next to a current lane in which the vehicle is operating, the bounding area having a size determined by, at least in part, the map data and a current position of the vehicle, wherein a shape of the bounding area is dynamically adjusted to correlate with the lane geometry;

produce a normalized bounding area that includes an area that is smaller than an area of the bounding area based on a normalized error of the one or more radar sensors;

determine and dynamically update a confidence score based on, at least one of, a time of detection of the radar objects, object-to-object position correlation of the radar objects, a quantity of the radar objects located within the bounding area, and/or a pattern defined by the radar objects;

determine and dynamically update a lane score based, at least in part, on the confidence score, wherein the lane score has a weighted or exponential relationship with the confidence score wherein the lane score increases at an increasing rate in response to a persistence of the confidence score and decreases at a predetermined rate over time in response to a decrease in the persistence of the confidence score;

compare the lane score to a lane score threshold;

determine whether an unclassified hazard is present in the adjacent lane based on the lane score, wherein the unclassified hazard is determined to be present in response to the lane score being greater than the lane score threshold;

operate the vehicle based on the determination of whether the unclassified hazard is present in the adjacent lane, including:

prevent an autonomous lane change in response to a determination that the unclassified hazard is present in the adjacent lane; and enable an autonomous lane change in response to a determination that the unclassified hazard is not present in the adjacent lane.

16. The vehicle of claim 15, wherein the controller is configured to, by the one or more processors:

obtain from one or more cameras onboard the vehicle, vision data that includes the portion of the adjacent lane; and wherein the size of the bounding area is based on, at least in part, the map data, the current position of the vehicle, and the vision data.

17. The method of claim 1, further comprising, by the one or more processors, normalizing the bounding area to provide a normalized line in response to a repeating pattern of the radar objects along an extended longitudinal region relative to the vehicle.

18. The system of claim 8, wherein the controller is configured to, by the one or more processors, normalize the bounding area to provide a normalized line in response to a repeating pattern of the radar objects along an extended longitudinal region relative to the vehicle.

19. The vehicle of claim 15, wherein the controller is configured to, by the one or more processors, normalize the bounding area to provide a normalized line in response to a repeating pattern of the radar objects along an extended longitudinal region relative to the vehicle.

\* \* \* \* \*